(No Model.)

A. B. LANIER.
SUGAR SKIMMER AND COOLER.

No. 247,073. Patented Sept. 13, 1881.

WITNESSES:
N. E. Whitney
C. Sedgwick

INVENTOR:
A. B. Lanier
BY Munn & Co
ATTORNEYS.

UNITED STATES PATENT OFFICE.

AUGUSTUS B. LANIER, OF OLIVER, GEORGIA.

SUGAR SKIMMER AND COOLER.

SPECIFICATION forming part of Letters Patent No. 247,073, dated September 13, 1881.

Application filed January 18, 1881. (No model.)

*To all whom it may concern:*

Be it known that I, AUGUSTUS B. LANIER, of Oliver, in the county of Screven and State of Georgia, have invented a new and useful Improvement in Sugar Skimmers and Coolers, of which the following is a full, clear, and exact description.

Figure 1:
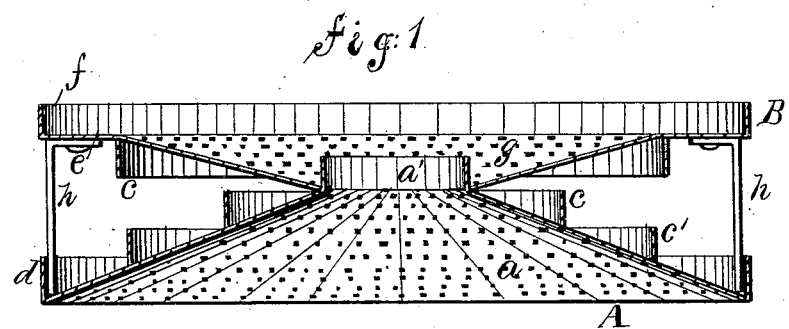
Figure 2:
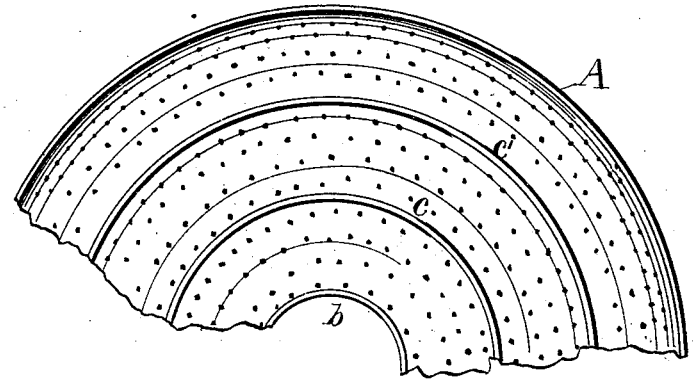
Figure 3:
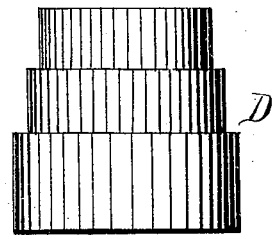

Figure 1 is a sectional view of the skimmer and cooler; Fig. 2, a plan of the lower section, and Fig. 3 a plan of the adjustable tubes.

Similar letters of reference indicate corresponding parts.

My invention relates to devices which are attached to concentrating-boilers for cane-juice for the purpose of cooling and straining the scum that rises and returning only the juices to the boiler, thus separating a large amount of the impurities from the matter being boiled; and it has for its object a practical machine of simplified construction, and one which can be cheaply made and easily cleaned and fitted to ordinary boilers without great expense and labor.

The bottom section, A, has the form of an inverted funnel, and the conical part $a$ is perforated with numerous small holes, and is provided at the opening $b$ at the top with a circular collar, $a'$. The concentric rings $c\ c'$, which form the scum-caps, are secured to the conical perforated bed $a$ at equal distances between the rim $a'$ and the outside rim, $d$, which latter prevents the overflow of the juices.

The upper section, B, is concave in form and perforated at $g$, as shown, and is formed with the scum-table $e$ and the outer rim, $f$, extending upward, and it is provided on the under side with the guide-rim $c$ and the legs $h$, which are so attached that they will fit inside of the rim $d$ of the lower section. The opening in the center of the upper section is of such size as to fit closely over the collar $a'$.

The two sections, when placed together, are to be secured inside the pan or boiler, near the top, and the froths of the boiling juices will be forced up through the central opening and deposited on the scum-table $e$, the juices carried with them flowing back through the skimmer portion of the upper section upon the lower section, where any froth which may pass through the skimmer is retained by the froth-cups, the liquid ultimately falling back into the pan or boiler.

When it is desired to regulate the flow of scum upon the skimmer, the adjustable tubes D, which are made to fit each other and to fit accurately the collar $a'$, are to be used, adjusting them as circumstances may require.

The lower section is complete for the purpose of skimming in itself, and may be used alone, if desired; but better results are obtained by using both sections together.

In cleaning, all of the parts are separated from each other, and it is thus accomplished with very little trouble and labor.

I am aware that it is not new in coolers and strainers to cause the froth from the boiling juice to pass up through the inverted funnel-shaped cone and fall upon another perforated cone, from which it descends clear and cool into the vessel.

Having thus described my invention, I claim as new and desire to secure by Letters Patent—

In coolers and skimmers, the section A, having upwardly-projecting cone with perforations, collar $a'$, rings $c\ c'$, and rim $d$, in combination with the section B, having a rim, $c$, flange $f$, legs $h$, and downwardly-projecting perforated cone, as shown and described.

AUGUSTUS B. LANIER.

Witnesses:
H. P. BREWER,
W. T. BREWER.